United States Patent [19]
Cairns

[11] 3,896,036
[45] July 22, 1975

[54] BEARING COMPOSITIONS

[75] Inventor: James Cairns, Cherry Hill, N.J.

[73] Assignee: Garlock Inc., Palmyra, N.Y.

[22] Filed: Mar. 17, 1969

[21] Appl. No.: 807,868

[52] U.S. Cl. .............................. 252/12; 252/12.4
[51] Int. Cl. ..................... C10m 7/28; C10m 7/02
[58] Field of Search .......... 252/12, 12.2, 12.4, 12.6

[56] References Cited
UNITED STATES PATENTS

| | | | |
|---|---|---|---|
| 2,461,069 | 8/1969 | Waldhuter et al. | 252/12 |
| 3,122,505 | 2/1964 | Rulon-Miller et al. | 252/12 |
| 3,215,629 | 11/1965 | Weber et al. | 252/12 |
| 3,234,128 | 2/1966 | McLeish et al. | 252/12 |
| 3,429,720 | 2/1969 | Houston et al. | 252/12 |

FOREIGN PATENTS OR APPLICATIONS

| | | | |
|---|---|---|---|
| 1,505,744 | 11/1967 | France | 252/12 |
| 1,533,551 | 6/1968 | France | 252/12 |
| 366,697 | 2/1963 | Switzerland | 252/12 |
| 1,262,687 | 3/1968 | Germany | 252/12 |

OTHER PUBLICATIONS

"Plastics as Bearing Materials, with Particular Reference to PTFE," by Pratt, in Plastics Institute, London Transactions, Vol. 32, No. 100, August 1964, pp. 255-260.

"Recent Developements in Polytetrafluoroethylene Based Dry Bearing Materials and Treatments" by Pratt, in Institution of Mech. Eng. Proceedings Lub. and Wear Convention, Vol. 181, Part 30, 1966-1967, Pages 58-69.

German Magazine, "Kontruktion," 1967, Issue 10, p. 407 including a review of an article by R. B. Lewis entitled "Predicting Bearing Performance of Filled Teflon TFE Resins," published in the Journal of Engineering for Industry Transactions ASME, Series B-89, 1967, No. 1, pp. 182-186.

Primary Examiner—Daniel E. Wyman
Assistant Examiner—I. Vaughn
Attorney, Agent, or Firm—Woodcock, Washburn, Kurtz & Mackiewicz

[57] ABSTRACT

A plain bearing material comprising, in percent by volume, from about 40% to about 95% of a fluorocarbon resin, such as polytetrafluoroethylene; from about 5% to about 60% of cadmium or an oxide of cadmium; and from about 0.1% to about 35% of a filler characterized by a hardness greater than the hardness of cadmium oxide, such as bronze, for example. Plain bearings produced from such material exhibit a wear resistance of over five hundred times that of a bearing formed of a fluorocarbon resin filled with either cadmium oxide or bronze alone, and of more than double the wear resistance of bearings formed of the best lead-bronze-fluorocarbon resin systems of the prior art.

11 Claims, 2 Drawing Figures

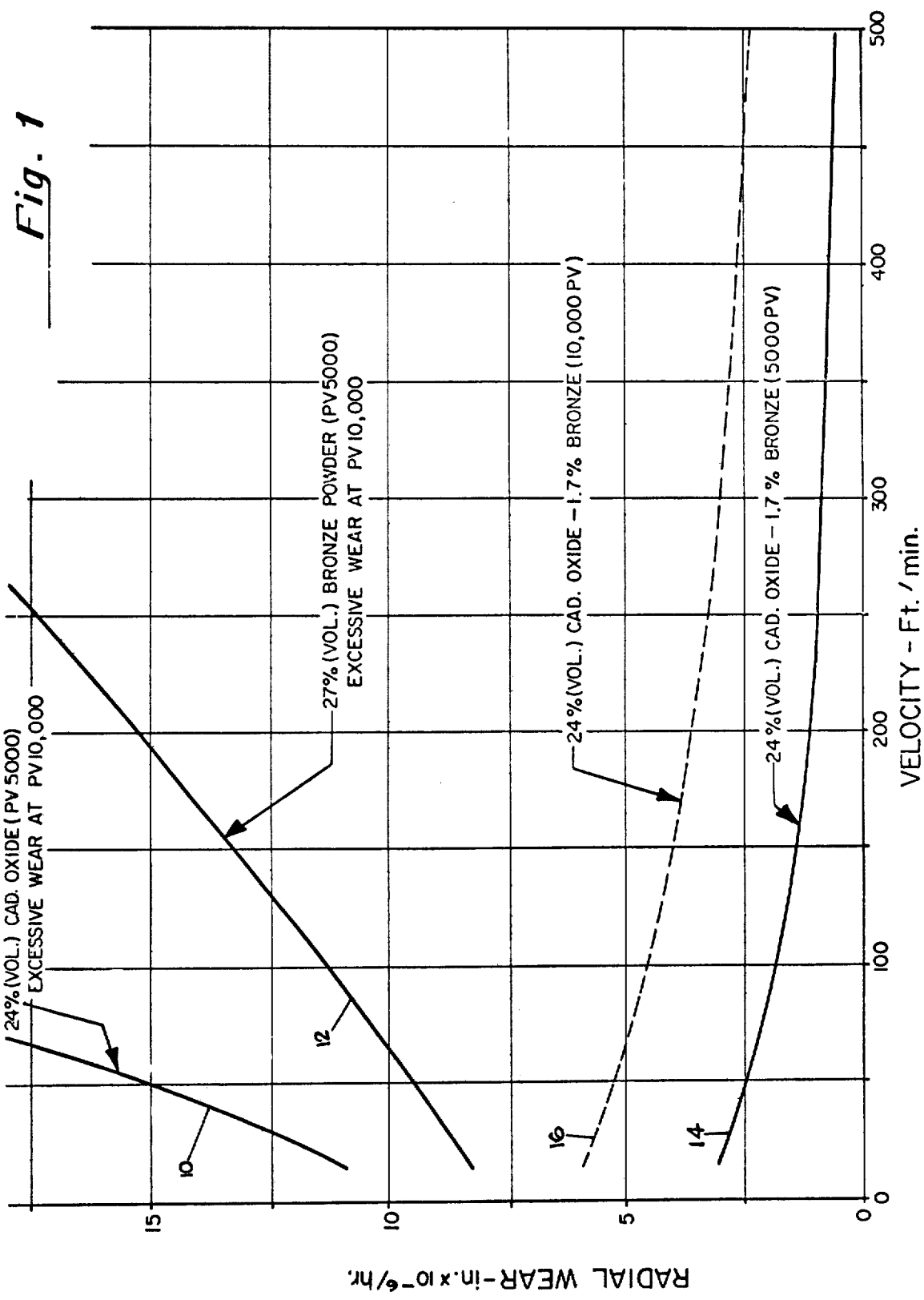

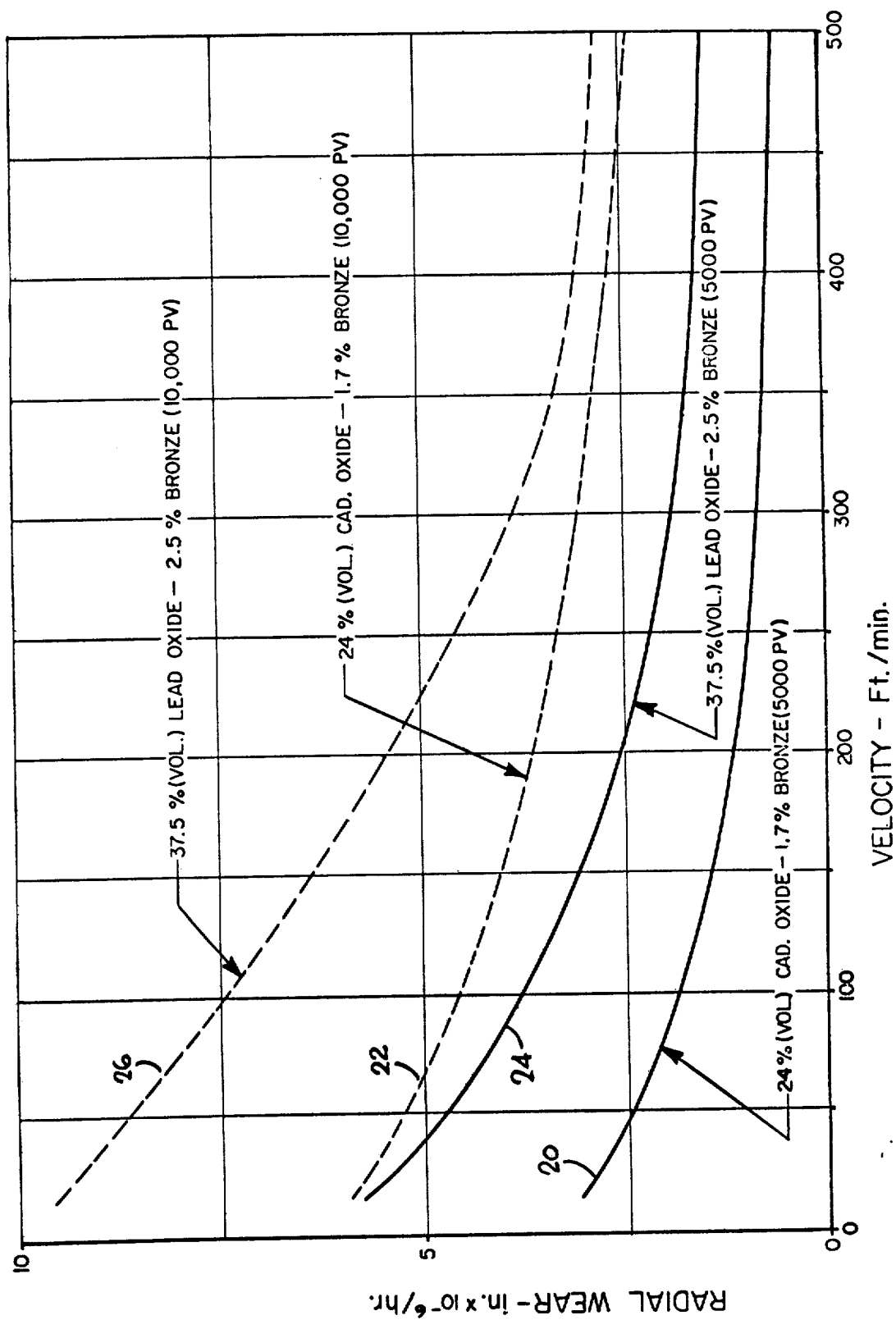

BEARING COMPOSITIONS

BACKGROUND OF THE INVENTION

1. Field of the Invention

This invention relates to bearing compositions and, more particularly, is concerned with filled fluorocarbon resin mixtures including a blend of certain fillers, within certain proportions, which mixtures are useful to provide plain bearings exhibiting a resistance to wear and certain physical properties which are unparallelled by the bearings of the prior art.

2. Description of the Prior Art

The production of plain bearings from filled fluorocarbon mixtures is known. The expression "plain bearing" as used herein includes any member or assembly having a surface which bears either directly, or through a lubricant, against another surface relative to which it has sliding movement during operation and use. The purpose of the bearing may be to transmit a load from one to the other of such surfaces, or may be to provide a seal, or make electrical contact. Therefore, plain bearings include all or parts of journal bearings, thrust washers, piston rings, mechanical packings, antifriction bearing cages and separators, pistons, cylinders, and machine slides.

Fluorocarbon resins such as polytetrafluoroethylene (hereinafter PTFE) have a low coefficient of friction, and this characteristic of the materials suggested their use in bearing applications. It was soon realized, however, that PTFE has an extremely high wear rate, and required the addition of a filler, such as a silicate, before it could be practical for use in bearing applications. Various combinations of two or more fillers for addition to the PTFE have also been suggested. For example, U.S. Pat. No. 3,122,505-Rulon-Miller et al discloses the production of bearings from PTFE mixtures including a silicate and a third material, such as aluminum, molybdenum, silver, copper, lead, or an oxide of copper or lead, wherein the silicate is present in from equal parts (by volume) to twice the amount of metal or metal oxide present in the mixture. Further, U.S. Pat. No. 3,234,128-McLeish et al discloses plain bearings formed of a mixture of PTFE, lead or lead oxide, and a copper alloy, such as bronze. Heretofore, the PTFE-lead oxide-bronze systems have been considered the best candidates for the production of plain bearings by virtue of their superior wear resistance in comparison to other PTFE combinations of the prior art.

SUMMARY OF THE INVENTION

Unexpectedly, I have discovered that when a certain combination of filler materials are added in certain proportions to a fluorocarbon resin, a new class of plain bearing materials can be obtained which are characterized not only by an improved resistance to wear, but also exhibit numerous other improved physical properties. The plain bearing materials of the present invention afford a dramatic improvement in virtually all of the parameters required for successful bearing applications. Their wear resistance is more than double the wear resistance of the best prior art bearing materials. They are characterized by a lower specific gravity, higher tensile and compressive strengths, and thermal properties superior to those of the PTFE-lead oxide-bronze systems of the prior art. Briefly stated, the plain bearing compositions of the present invention comprise, in percent by volume, from about 40% to about 95% of a fluorocarbon resin, from about 5% to about 60% of cadmium or an oxide of cadmium, and from 0.1% to about 35% of a filler characterized by a hardness greater than the hardness of cadmium oxide.

Generally speaking, any sinterable fluorocarbon resin or fluoroplastic can be used to provide the plain bearing materials in accordance with the present invention. Such fluorocarbon plastics or resins include the high molecular weight polymers and co-polymers of tetrafluoroethylene, chlorotrifluoroethylene, hexafluoropropylene, and vinylidene fluoride. Specific polymeric resins contemplated in the production of the plain bearing materials of the invention are polytetrafluoroethylene, polychlorotrifluoroethylene, co-polymers of tetrafluoroethylene and polyvinylidene fluoride, hexafluoropropylene, and fluorinated ethylene-propylene co-polymers. Of course, it is possible to employ a mixture of two or more different fluorocarbon resins or fluoroplastics in the production of the plain bearing materials of the invention. Other suitable fluorocarbon resins useful in the practice of the invention will readily occur to those skilled in the art.

Though the compositions of the invention require the presence, in the proportions stated, of either cadmium or an oxide of cadmium, it will be appreciated that a mixture of cadmium and cadmium oxide can also be used. In this regard, as between cadmium and its oxide, the oxide is preferred with the fluorocarbon resins (such as PTFE) which are characterized by higher sintering temperatures.

Generally speaking, any filler material characterized by a hardness greater than the hardness of cadmium oxide can be employed to provide the plain bearing compositions of the present invention. Suitable fillers and combinations of fillers include metals (in fibrous or powder form) such as, for example, copper, aluminum, nickel, chromium, titanium, stainless steel and tungsten; metal alloys such as, for example, alloys of copper with tin, zinc, aluminum or silicon; metal oxides such as, for example, iron oxide; refractory materials such as the borides, nitrides, and carbides of metals such as, for example, titanium, zirconium, vanadium, tantalum, chromium, molybdenum and tungsten, and also including the refractory oxides of metals such as aluminum, chromium, magnesium, silicon, titanium, and zirconium; quartz in either fibrous or pulverized form; and glass in fibrous or powder form. Other suitable fillers characterized by a hardness greater than the hardness of cadmium oxide will readily occur to those skilled in the art.

The proportions of the various constituent parts of the plain bearing materials of the invention can be adjusted within the percentages specified above, to obtain optimum performance under varying conditions. A preferred blend for use in dry bearing applications comprises, in percent by volume, between about 20% and about 30% of cadmium or cadmium oxide and from about 1% to about 3% of a filler having the hardness greater than the hardness of cadmium oxide (preferably a hard copper alloy consisting of 90% copper and 10% tin), the remainder being granular PTFE. Where the bearing is cooled during use, the hard filler percentages should be increased to provide optimum wear characteristics. Journal tests conducted on a blend of cadmium oxide-bronze-PTFE within the foregoing preferred proportion have shown the material to exhibit a wear resistance of up to five hundred times of that of a PTFE bearing material including a single filler of cadmium oxide or bronze alone. Moreover, the wear resistance of the preferred blend is more than double that of the best lead-bronze-PTFE system currently available. A particularly outstanding group of compositions of the invention are those in which the volume of cadmium or cadmium oxide in the final mixture is at least equal to, and is preferably greater than, the volume of the filler characterized by a hardness greater than the hardness of cadmium oxide.

In accordance with the present invention the fillers are incorporated into the fluorocarbon resin by any of the well-known filler incorporating techniques used to provide homogeneously filled PTFE bearing materials. For example, the desired quantity of the fluorocarbon resin, in the form of a dry granular powder, together with particulate cadmium or cadmium oxide and the hard filler (in the proportions desired) are tumble-mixed at room temperature and thereafter further blended in standard pulverizing or impact mill equipment to obtain a homogeneous mixture. Alternatively, the cadmium or cadmium oxide and hard filler can be added to an aqueous suspension or dispersion of the fluorocarbon resin and the particles dispersed in the suspension by agitation. Particulate solids can then be coagulated by the addition of a minor amount of aluminum nitrate. The procedure can be hastened by heating the dispersion. The particulate solids are then extracted, dried in an air circulating oven as, for example, at 400°F., and subsequently granulated. Other forms of coagulating the solids from the aqueous dispersion are well known and will readily occur to those skilled in the art.

The homogeneous blend of the fluorocarbon resin, the cadmium or cadmium oxide, and the hard filler are compacted into the desired bearing shape at room temperature, preferably at pressures of 20,000 p.s.i. or more. The resulting preforms are free sintered at the sintering temperature of the particular fluorocarbon resin material that is used. In the case of PTFE, sintering temperatures of the order of 700°F. are used. Alternatively, the homogeneous blend is extruded in a repeating ram type of apparatus where, in effect, a continuous molding and sintering occurs.

Other methods of incorporating the fillers into the fluorocarbon resin to provide the plain bearing materials of the invention are described in U.S. Pat. Nos. 3,122,505 and 3,234,128 referred to above.

In order that those skilled in the art may better understand how the present invention may be practiced and to demonstrate the unexpected results attained, the following examples are given by way of illustration and not by way of limitation. All percentages reported are by volume.

EXAMPLE 1

Tests were conducted upon journal bearings of various blends of plain bearing material compositions. The journal bearings tested were 1 inch in diameter by 1 inch long. A low carbon steel shaft with a 10 micro-inch mating surface finish was used. Each test was run with continuous rotation, dry and at room temperature for 200 hours. Unidirectional loading was maintained constant throughout the test. The test shaft was mounted by a collet to a horizontal spindle, electrically driven via stepped pulleys to achieve the test speed. The specimen bushing was pressed into a steel housing with an interference fit of 0.008 inch. This was the ted to a load yoke from which dead weights were pended as required by the test being conducted. resultant clearance between test bushing and the for dry room temperature operation was 0.004 in Micrometer measurements of the wall thickness the specimen at the maximum load point were corded before and after completion of the test. A gauge attached to the load yoke was connected electronic recorder to monitor frictional forces, thermocouple was similarly connected to establish erating temperatures close to the interface.

Table 1 below shows the resultant radial wear tained on the various test specimens at speeds of 50 to 500 feet per minute and at a PV of 5,000 p.s f.p.m. The expression "PV" is the product of bearing pressure (in pounds per square inch) and rubbing speed (in feet per minute). All percentages are by ume.

TABLE 1

| | Bearing Compositions | AVERAGE WEAR RATE (In Inches/200 Hours) | |
|---|---|---|---|
| | | Below 100 f.p.m. | At 500 f.p.m. |
| (a) | 22% fiberglass-78% PTFE | $15 \times 10^{-4}$ | |
| (b) | 27% bronze powder-73% PTFE | $22 \times 10^{-4}$ | |
| (c) | 24% CdO-76% PTFE | $38 \times 10^{-4}$ | |
| (d) | 25% CdO-1.7% bronze-73.3% PTFE | $2 \times 10^{-4}$ | |
| (e) | 25% CdO-2% fiberglass-73% PTFE | $4 \times 10^{-4}$ | |
| (f) | 24% CdO-1% nickel-75% PTFE | $5 \times 10^{-4}$ | |

As shown in Table 1 above, the compositions of invention, identified as (d), (e), (f), exhibited rates which were considerably below the wear ra PTFE combinations with cadmium oxide, or bron fiberglass alone, i.e. compositions (a), (b), and Moreover, the wear rates of the plain bearings duced from compositions (a), (b), and (c), incre as the rubbing speed increased from 100 f.p.m. f.p.m. On the other hand, the wear rate of the com tions [(d), (e), (f)] actually decreased as the speed was increased.

EXAMPLE 2

Tests were conducted on thrust washer config tions having a 1⅛ inch outside diameter with square inch contact area. The mating surface w carbon steel with a finish of 10 micro-inches tests were conducted on equipment that was a sion of the standard production table-mounted press. A variable speed electrical D.C. drive unit vided control of the test speed. The lower sp holder, mounted on the table, provided a ho surface with a 1.125 inch diameter recess in w plastic test specimen was held. A steel wear vided the mating surface and was held via aligning ball against the upper specimen holder drill head. Force was applied on the plastic test sp men by suspending weights from the spindle feed A blade-type force gauge was used to check loads by insertion between the specimen holders to commencement of testing. The actual wear termined by micrometer readings of specimen ness taken before and after the tests were conducted. The test data set forth in Table 2 below were obtained at a test speed of 100 f.p.m. and a PV of 5,000 p.s.i.-f.p.m. All percentages are by volume.

TABLE 2

| Bearing Composition | | WEAR RATE (Inches/200 Hours) |
|---|---|---|
| (g) | 24% CdO-76% PTFE | $450 \times 10^{-4}$ |
| (h) | 27% bronze powder-73% PTFE | $42 \times 10^{-4}$ |
| (i) | 22% fiberglass-78% PTFE | $20 \times 10^{-4}$ |
| (j) | 25% CdO-1.7% bronze-73.3% PTFE | $7 \times 10^{-4}$ |

As will be appreciated by those skilled in the art, the plain bearing materials of the present invention not only demonstrate improvements in wear, but more importantly, they indicate a breakthrough into the successful use of fluoroplastic bearings at higher velocities. Furthermore, the maximum PV loadings to which filled PTFE bearings can be subjected and still maintain an extended useful wear life is significantly increased by the invention. Over the whole range of speeds from 50 to 500 f.p.m. the compositions of the invention have been tested at PV's in excess of 15,000 p.s.i.-f.p.m. At PV's of 10,000 p.s.i.-f.p.m. under conditions of Example 1, most available materials fail or show excessive wear. On the other hand, the preferred composition of the invention (CdO-bronze-PTFE) wore an average of only $6 \times 10^{-4}$ over the complete speed range.

DESCRIPTION OF DRAWINGS

FIG. 1 graphically compares the wear rate of a composition of the invention comprising PTFE, cadmium oxide and bronze, with the wear rate of PTFE filled plain bearing compositions including a single filler of either cadmium oxide or bronze alone; and FIG. 2 graphically compares the wear rate of a composition of the invention with the wear rate of the best lead oxide-bronze-PTFE composition of the prior art.

The data from which the curves shown in FIGS. 1 and 2 were drawn were attained from tests conducted as per Example 1 above at PV values of 5,000 p.s.i.-f.p.m. and 10,000 p.s.i.-f.p.m.

Curve 10 of FIG. 1 shows the wear rate, at different rubbing velocities, of a bearing material formed of PTFE filled with 24% of cadmium oxide. As seen from FIG. 1, this material exhibited a rapidly increasing wear rate as the rubbing velocity was increased, and would be unsuitable as a plain bearing material at rubbing speeds exceeding 100 f.p.m. At PV values of 10,000 p.s.i.-f.p.m. the material was characterized by exceedingly high wear rates, greatly in excess of those attained at a PV value of 5,000 p.s.i.-f.p.m.

Curve 12 of FIG. 1 shows the rapid increase in the wear rate of a plain bearing material composed of a PTFE-bronze material containing 27% by volume of bronze.

Curve 14 of FIG. 1 shows the wear rate, at different rubbing speeds, of a material of the invention comprising 24% cadmium oxide, 1.7% bronze, and the remainder PTFE. As seen from FIG. 1, the wear rate of this composition actually decreased with increased rubbing velocity and was considerably lower than that of PTFE mixture containing either cadmium oxide alone (Curve 10) or bronze powder alone (Curve 12).

Curve 16 of FIG. 1 shows the wear rate of the 24% CdO-1.7% bronze-PTFE composition wherein the PV value was increased to 10,000 p.s.i.-f.p.m. Thus, despite the fact that the load was doubled, the compositions of the invention nevertheless exhibited a wear rate which continued to decline with increased rubbing velocity and which was significantly less than the wear rates of the PTFE-CdO or PTFE-bronze compositions (Curves 12 and 14).

Prior to the present invention, the best wear resistant filled PTFE compound was a lead oxide-bronze-PTFE system. Numerous tests were run to compare that prior art system with the compositions of the present invention. The results establish that an average 100% improvement was realized by the compositions of the present invention. In this regard, FIG. 2 shows a comparison, at PV values of 5,000 p.s.i.-f.p.m. and 10,000 p.s.i.-f.p.m. respectively, of the wear resistance of a plain bearing material of the invention with the wear rate of the best lead oxide-bronze-PTFE combination available in the prior art. Curves 20 and 22 show the wear rates of the compositions of the invention at PV values of 5,000 p.s.i.-f.p.m. and 10,000 p.s.i.-f.p.m. respectively. Curves 24 and 26 show the wear rates of the lead oxide-bronze-PTFE system at PV values of 5,000 p.s.i.-f.p.m. and 10,000 p.s.i.-f.p.m. respectively. On a test conducted for 500 hours wherein the rubbing velocity was 100 f.p.m. and a PV value of 10,000 p.s.i.-f.p.m. was used, the composition of the invention (24% CdO-1.7% bronze-remainder PTFE) showed a radial wear of $9 \times 10^{-4}$ inches, whereas the lead oxide-bronze-PTFE prior art composition showed a radial wear of $47 \times 10^{-4}$ inches.

The compositions of the present invention also afford improvements in processing techniques over prior art plain bearing materials. By using molding pressures in excess of 20,000 p.s.i., a more dense material is obtained from the compositions of the invention which accordingly results in more consistent wear rates, as well as a reduction of any tendency of the material to be affected by exothermic reactions during the sintering operation. Such exothermic reactions are particularly evident when employing prior art oxide additives, and the earlier lead oxide-bronze-PTFE systems are accordingly restricted to the production of parts which are less than 2 inches thick for precisely this reason.

Additional tests were conducted further to demonstrate the improvement in the materials of this invention over the earlier lead oxide-bronze-PTFE systems. More specifically, slugs 1½ inch in diameter by one-half inch long were preformed at 20,000 p.s.i. both from the lead oxide-bronze-PTFE systems of the prior art as well as of the plain bearing compositions of the invention. The slugs were sintered at 700°F., the temperature being raised at a rate of 120°F. per minute up to 500°F. and then at a rate of 60°F. per minute up to 700°F. The average recommended time at 700°F. for parts of this size is 1 hour. This time was extended to demonstrate the tendency of the constituents in the compositions to react. The slugs formed from the compositions of the invention showed no signs of any thermal degradation whatever. On the other hand, the lead oxide-bronze-PTFE materials disintegrated after 80–90 minutes.

It should be understood that while the present invention has been described in considerable detail with respect to certain specific embodiments thereof, it is not

What is claimed is:

1. A plain bearing material comprising, in percent by volume, from about 40% to about 95% of a fluorocarbon resin, from about 5% to about 60% of cadmium or an oxide of cadmium, and from about 0.1% to about 35% of a filler selected from the class consisting of copper, alloys of copper, quartz, and glass.

2. The plain bearing material of claim 1 in which said filler content ranges from about 1% to about 3%.

3. The plain bearing material of claim 1 in which said filler is bronze.

4. The plain bearing material of claim 1 in which said filler is glass.

5. The plain bearing material of claim 1 in which said filler is quartz.

6. The plain bearing material of claim 1 comprising, in percent by volume, from about 67% to about 79% of polytetrafluoroethylene, from about 20% to about 30% of cadmium oxide, and from about 1% to about 3% of bronze.

7. A bearing for a relatively moving surface comprising a homogeneous mixture of, in percent by volume, from about 40% to about 95% of a fluorocarbon resin, from about 5% to about 60% of cadmium or an oxide of cadmium, and and from about 0.1% to about 35% of a filler selected from the class consisting of copper, alloys of copper, quartz, and glass.

8. The bearing of claim 7 in which said filler content ranges from about 1% to about 3%.

9. The bearing of claim 7 in which said filler is bronze.

10. The bearing of claim 7 in which said homogeneous mixture comprises, in percent by volume, from about 67% to about 79% of polytetrafluoroethylene, from about 20% to about 30% of cadmium oxide, and from about 1% to about 3% of bronze.

11. A plain bearing material consisting of a fluorocarbon resin containing 5% to 60% by volume of a material selected from the group consisting of cadmium and cadmium oxide, and 0.1% to 35% by volume of a material selected from the group consisting of copper and copper-tin alloys.

* * * * *